R. DUNCAN.
MEANS FOR CONTROLLING THE OPERATION OF TALKING MACHINES.
APPLICATION FILED AUG. 30, 1919.
1,357,037.
Patented Oct. 26, 1920.
2 SHEETS—SHEET 1.
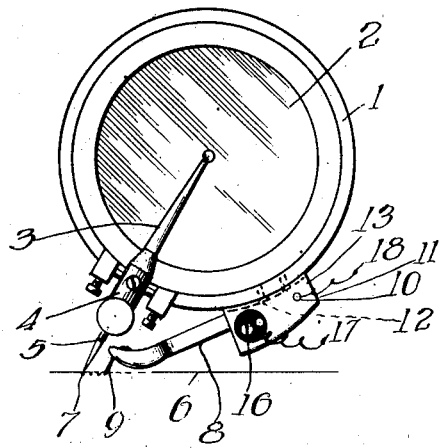
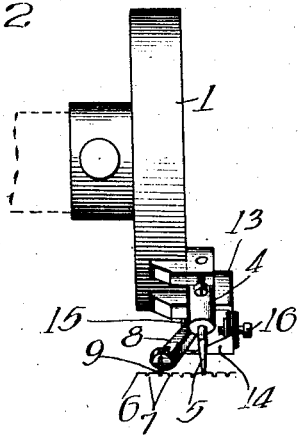
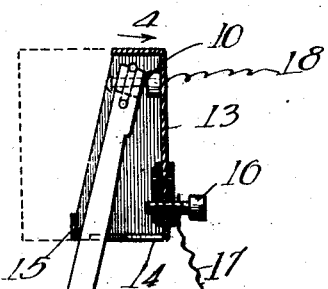
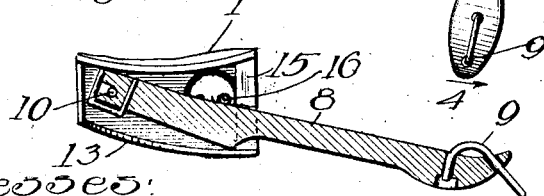
Witnesses:
Harry R. White
W. P. Hilroy
Inventor
Raymond Duncan.
By A. Miller Belfield Atty.

R. DUNCAN.
MEANS FOR CONTROLLING THE OPERATION OF TALKING MACHINES.
APPLICATION FILED AUG. 30, 1919.
1,357,037.
Patented Oct. 26, 1920.
2 SHEETS—SHEET 2.
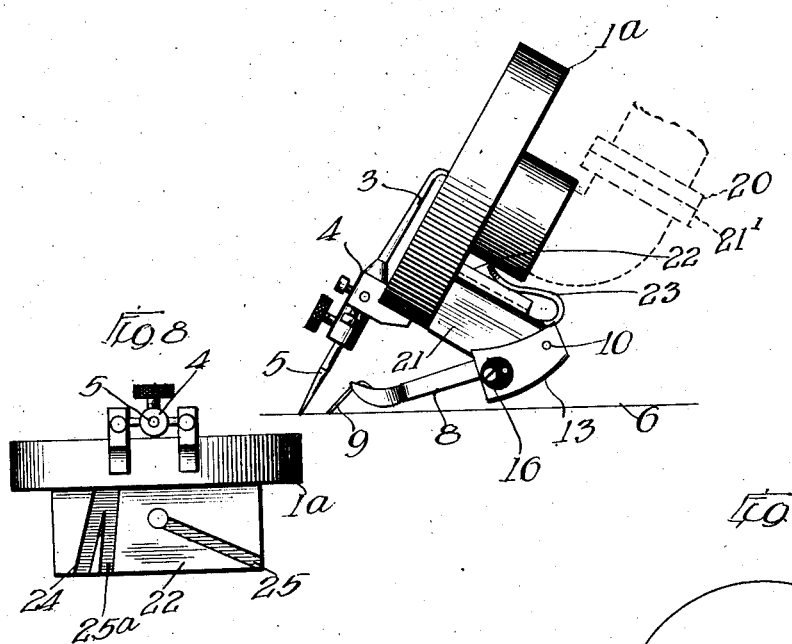
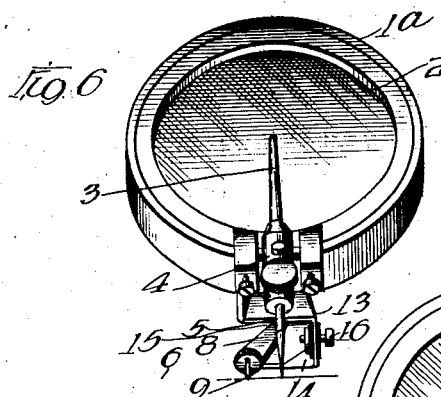
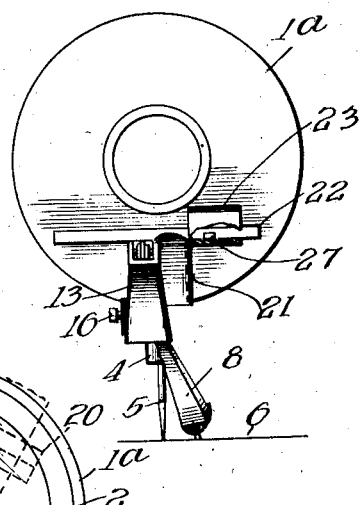
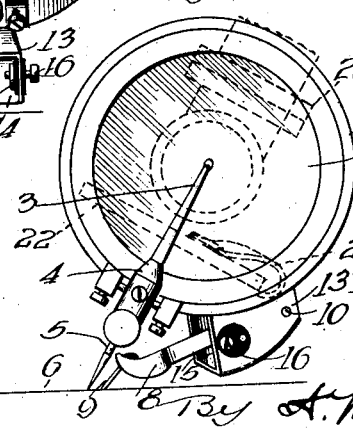
Inventor:
Raymond Duncan
Witnesses:

UNITED STATES PATENT OFFICE.

RAYMOND DUNCAN, OF CHICAGO, ILLINOIS.

MEANS FOR CONTROLLING THE OPERATION OF TALKING-MACHINES.

1,357,037. Specification of Letters Patent. Patented Oct. 26, 1920.

Application filed August 30, 1919. Serial No. 320,775.

*To all whom it may concern:*

Be it known that I, RAYMOND DUNCAN, a citizen of the United States, residing at Chicago, in the county of Cook and State of Illinois, have invented a certain new and useful Improvement in Means for Controlling the Operation of Talking-Machines, of which the following is a full, clear, concise, and exact description, reference being had to the accompanying drawings, forming a part of this specification.

My invention relates to improvements in means for controlling the operation of talking machines, and particularly to means for automatically controlling and especially stopping the rotation of the record support.

In Patent No. 1,211,110, January 2, 1917, issued to me for stop mechanism for talking machines, I show a mechanism for controlling and stopping the rotation of the record support.

One of the objects of the invention of the present application is to provide a simple, practical, and effective mechanism for controlling the operation of talking machines, and especially for controlling and automatically stopping the rotation of the record support.

Another object of the invention is to obtain simplicity in construction and reliability and efficiency in operation.

Another object of the invention is to adapt the device for use when either a hill and dale record or a laterally undulating or zigzag record is being played.

Another object of the invention is to secure the foregoing and other desirable results in a simple and expeditious manner.

In the accompanying drawings Figure 1 is a side elevation of a reproducer of a phonograph machine provided with record support controlling mechanism embodying my present invention;

Fig. 2 is a side or edge view of the same;

Fig. 3 is a cross section of a part of the device on an enlarged scale;

Fig. 4 is a cross section taken on line 4—4 in Fig. 3;

Fig. 5 is an edge view of a modified form of reproducer, adapted for use in connection with either hill and dale or zigzag records;

Fig. 6 is a front view of the same;

Fig. 7 is a rear view of the same;

Fig. 8 is a view of a detail of construction; and

Fig. 9 is a view of a portion of the device in an adjustment differing from that in Figs. 5, 6 and 7.

Referring to the drawings and especially to Figs. 1 to 4 inclusive, I show a reproducer 1, having a diaphragm 2 provided with a connection 3 having a holder 4 carrying a stylus 5. I also show a portion of a record 6 having its surface provided with grooves 7 in which the stylus 5 is adapted to travel.

The reproducer also carries a member 8 provided with a point 9 also adapted to engage the record grooves 7. This member 8 is pivotally mounted so that it can swing up and down with reference to the record 6, and this pivotal mounting which is formed by a pin 10 is loose so that said member 8 may also be swung or moved sidewise as well as up and down. The pin 10 is preferably carried by a clip 11 secured to the rim of the reproducer 1 as by screws 12, said clip being provided or constructed with a housing 13 in which the end portion of the member 8 is confined. An inclined surface or incline 14 is formed at the open end of this housing 13 and the member 8 is arranged to rest upon said surface 14. The inclination of the surface 14 is sufficient to cause or permit said member 8 to slide down said surface as far as permitted. At the lower end of said incline a stop 15 is provided in the form of an upturned end portion of the metal forming the clip, so that the member 8 will strike against said stop and therefore be arrested in its movement when it is slid down said incline 14.

Thus the member 8 will fall so that its point 9 will fit into one of the record grooves when the reproducer is put in position. When the groove is thus engaged said member 8 will be at the lower end of the incline 14, that is to say as far to the left as possible, viewing the device as in Fig. 2.

A contact screw 16 is carried by the housing 13 and insulated from the same, the inner end of the screw 16 projecting into the interior of the housing so as to be struck by the member 8 when the same is in its right hand position (Fig. 2). An electrical circuit wire 17 is understood to be connected with this contact screw 16. Another electrical circuit wire 18 is understood to be connected with the pin 10 or housing 13. These electrical circuit wires are understood to run to a suitable brake mechanism which may be applied to the table or support for the record so as to stop the same.

Thus in the operation of the device when the reproducer is put in place, the stylus 7 will fit in the groove of the record at the beginning of the same and the playing will be started. The point 9 carried by the member 8 will fit into said groove, not at the beginning of the same but at a point in advance of the stylus 5. As the record support or table is rotated both stylus 5 and point 9 travel in the record groove and automatically advance, holding their relative positions separated from one another. When the end of the record groove is reached, however, the point 9 arrives at the end first and remains there, the stylus, however, continuing to advance. This results in the contacting of member 8 and the projecting end of the screw 16. This closes the circuit including the conductors 17 and 18, and thereby automatically operates the brake mechanism so as to stop the rotation of the turntable. This occurs at a time when the stylus 5 reaches the end of the groove, the arrangement of the stylus and member 8 being such as to bring this about. The incline 14 is for the purpose of separating the member 8 from the stylus before the device is put into operation. When the sound box is held in the hand before playing the record, preparatory to lowering it so that the stylus will rest upon the record, the member 8 by reason of its weight will slide down the incline 14 and thus separate it from the stylus and from the contact 16, so that when the sound box is lowered sufficiently to place the stylus on the record the member 8 will be sufficiently separated from the same to occupy its proper position in advance of the stylus. The lowering of the sound box to contact the stylus with the record, however, results in the member 8 being swung upwardly so that it is lifted from the incline 14 and put in position substantially opposite the contact 16. This is due to the fact that the point 9 on the member 8 comes in contact with the record before the stylus 5 itself, and therefore causes an upwardly swinging movement on the part of the member 8 to the extent indicated before the stylus 5 actually strikes the record. Thus in the operation of the device the point 9, the member 8 and the stylus 5 travel along the record groove in this separated condition, the member 8 not resting on the incline 14 but simply resting on the record and held separated from the stylus and contact 16 by the groove. When the point 9 reaches the end of the groove, it will fit and travel in the circular groove which is present in practically all records inside of the inner end of the playing groove, such circular groove being often known as a "retaining circle". Traveling in this circle the point 9 will have no lateral movement, whereas the stylus will continue to move across the record and toward the member 8 until the contact 16 reaches and contacts with the member 8, as previously described. If there is no central or retaining circle on a record, the point 9 will rest and travel on the flat surface of the record, and will be held against inward movement thereon by the centrifugal or similar force due to the rotation of the record.

The point 9 carried by the member 8 may be of any suitable construction or material, but as a matter of further improvement I preferably make the same of silk worm or some like material so that effective action may be secured without damaging the record or making any appreciable effect on the same. This point 9 may be inserted into apertures in the end of the member 8 as shown in Fig. 4.

Referring to Figs. 5 to 9 inclusive, of the drawings, I show a reproducer 1ª having a connection 3 provided with holder 4 carrying stylus 5, as in the other arrangement. This reproducer 1ª, however, is mounted on a swivel joint 20, 21', by which it may be turned so as to play hill and dale or zigzag records. In the Figs. 5, 6 and 7, the reproducer is shown swung or adjusted into position to play hill and dale records, the reproducer and diaphragm being crosswise of the end of the tone arm.

I also show the swinging member 8 provided with a groove engaging point 9 pivotally and loosely mounted on a pin 10 and swinging in a housing 13 provided with a contact screw 16 whose end is adapted to coöperate with the member 8 to open and close an electrical circuit running to an electrically operated braking mechanism. This housing 13 is not secured to the rim of the reproducer as in the first described arrangement, but instead is mounted to permit of its adjustment or change in position with reference to the reproducer. As a simple and effective arrangement the housing 13 is attached to, preferably formed integrally with, a carriage 21 adapted to be detachably mounted in several different positions upon a plate or support 22 secured to the reproducer 1ª, said carriage 21 being provided with a spring clip 23 adapted to engage the opposite side of said plate or support 22. The latter is preferably provided with three grooves 24, 25 and 25ª, (Fig. 8), and the carriage 21 is provided with a projection 27, (Fig. 7), adapted to slide in either one of said grooves 24, 25, or 25ª. In the figures the carriage 21 is shown in position with the projection 27 in the groove 24, holding said carriage and housing 13 in the position shown in the drawings. In this position the housing 13 is in the rear of the reproducer so that when the latter is lowered into playing position upon the record, the point 9 of the member 8 will engage a part of the groove in advance of the stylus, as shown in Fig. 6. This relationship of the point 9 and stylus 5 will continue until the end of the record groove is reached, at which time the member 8 will be moved to make contact with the screw 16 in the manner previously described in connection with the first mentioned arrangement.

When the carriage 21 is separated from the support 22 and changed in position so that its tongue engages the other groove 25, the member 8 will be in the position shown in Fig. 9, which is substantially the position of the arrangement first described, as will be seen by referring to Fig. 1. In this position it is intended that the reproducer shall be changed in position so that the diaphragm will be at right angles to the position shown in Figs. 5, 6 and 7, that is to say in a position substantially parallel with the tone arm, so that zigzag records may be played. The mechanism being thus substantially in the position shown in Fig. 1, the operation of the device is as set forth in connection with that figure.

If in the operation of the device the point 9 should slip out of the record groove at the end of same, the motion of the record—probably its centrifugal force—will throw or snap the member 8 outwardly against the contact 16, and thus stop the record support.

It will be understood that changes and modifications may be made without departing from the spirit of the invention.

What I claim is:

1. In combination, a reproducer including a stylus and circuit controlling means carried by said reproducer and comprising a swinging arm having a record groove engaging point serving as a contact device.

2. The combination of a reproducer having a stylus and circuit controlling mechanism carried by the reproducer comprising a swinging member having a record engaging point, said member being supported by the rim of the reproducer.

3. The combination of a reproducer having a stylus and circuit controlling mechanism carried by the reproducer comprising a swinging member having a record engaging point, said member being supported by the rim of the reproducer, and a contact coöperating with said member and located between the point thereof and the connection of the member with the reproducer.

4. The combination of a reproducer having a stylus and circuit controlling means carried by the reproducer and comprising a pivoted member provided with a record engaging point, and a contact adapted to coöperate with said member and located between said point and the pivotal support of the member.

5. The combination of a reproducer having a stylus and circuit controlling means carried by the reproducer and comprising a pivoted member provided with a record engaging point, a contact adapted to coöperate with said member and located between said point and the pivotal support of the member point and an incline on which said member rests.

6. The combination of a reproducer provided with a stylus and circuit controlling means carried by the reproducer and comprising a housing attached to the rim of the reproducer, a swinging member having one of its ends loosely pivoted at one end of said housing, an incline on which said member may rest located at the other end of said housing, a stop for limiting the movement of said member on said incline, and an adjustable contact carried by said housing and adapted to make contact with said member.

7. The combination of a reproducer having a connection permitting it to play different kinds of records and means controlled by the record for stopping the record support, said controlling means being adapted for operation with the reproducer in either position.

8. The combination of a reproducer having a connection permitting it to play different kinds of records and means controlled by the record for stopping the record support, said controlling means being adapted for operation with the reproducer in either position and comprising means for engaging the record groove and mechanism controlled thereby for closing an electrical circuit.

9. The combination of a reproducer having a connection permitting it to play different kinds of records, means for controlling an electrical circuit carried by said reproducer, and means whereby said circuit controlling means may be shifted in position to permit its use in different adjustments on the reproducer.

10. The combination of a reproducer having a connection permitting it to play different kinds of records, means for controlling an electrical circuit carried by said reproducer, and means whereby said circuit controlling means may be shifted in position to permit its use in different adjustments on the reproducer, said last mentioned means comprising a carriage adapted for attachment to the reproducer in different positions relatively thereto.

11. The combination of a reproducer having a connection permitting it to play different kinds of records, means for controlling an electrical circuit carried by said reproducer and means whereby said circuit controlling means may be shifted in position to permit its use in different adjustments on the reproducer, said last mentioned means comprising a carriage adapted for attachment to the reproducer in different positions relatively thereto, and a support on which said carriage may be mounted.

12. The combination of a reproducer having a connection permitting it to play different kinds of records, means for controlling an electrical circuit carried by said reproducer and means whereby said circuit controlling means may be shifted in position to permit its use in different adjustments on the reproducer, said last mentioned means comprising a carriage adapted for attachment to the reproducer in different positions relatively thereto, and a support on which said carriage may be mounted, said support being provided with a plurality of grooves and said carriage being provided with a projection adapted to fit in any one of said grooves.

13. The combination of a reproducer having a connection permitting it to play different kinds of records, means for controlling an electrical circuit carried by said reproducer and means whereby said circuit controlling means may be shifted in position to permit its use in different adjustments on the reproducer, said last mentioned means comprising a carriage adapted for attachment to the reproducer in different positions relatively thereto, and a support on which said carriage may be mounted, said support being provided with a plurality of grooves and said carriage being provided with a projection adapted to fit in any one of said grooves, and said circuit controlling mechanism comprising a swinging member carried by said carriage and provided with a record engaging point and a contact coöperating with said swinging member.

14. The combination of a reproducer having a connection permitting it to play different kinds of records, means for controlling an electrical circuit carried by said reproducer and means whereby said circuit controlling means may be shifted in position to permit its use in different adjustments on the reproducer, said last mentioned means comprising a carriage adapted for attachment to the reproducer in different positions relatively thereto, and a support on which said carriage may be mounted, said support being provided with a plurality of grooves and said carriage being provided with a projection adapted to fit in any one of said grooves, and said circuit controlling mechanism comprising a swinging member carried by said carriage and provided with a record engaging point and a contact coöperating with said swinging member, and an inclined surface on which said swinging member rests, said swinging member being also pivoted loosely to permit it to slide on said inclined surface.

In witness whereof, I hereunto subscribe my name this 21st day of August, A. D., 1919.

RAYMOND DUNCAN.